United States Patent

Moor et al.

[11] Patent Number: 6,045,057
[45] Date of Patent: Apr. 4, 2000

[54] METHOD AND APPARATUS FOR SPRAY APPLYING FIBER-REINFORCED RESINS WITH HIGH CERAMIC FIBER LOADING

[76] Inventors: Ronald C. Moor, 7962 Cooley Rd., Ravenna, Ohio 44266; Robert E. Arnold, 1079 Carol La., Tallmadge, Ohio 44278

[21] Appl. No.: 08/865,210

[22] Filed: May 29, 1997

[51] Int. Cl.$^7$ .................................................. A62C 5/02
[52] U.S. Cl. .............................. 239/9; 239/432; 239/433; 239/DIG. 8
[58] Field of Search ................................. 239/1, 8, 9, 11, 239/304, 104, 112, 398, 399, 400, 418, 419.3, 422, 423, 427, 427.3, 428, 429, 432, 427.5, 433, DIG. 8; 118/300; 427/426

[56] References Cited

U.S. PATENT DOCUMENTS

| | | | |
|---|---|---|---|
| 3,066,874 | 12/1962 | Becker | 239/422 |
| 3,111,272 | 11/1963 | Underdown | 239/1 |
| 3,801,009 | 4/1974 | Marshall | 239/1 |
| 3,829,016 | 8/1974 | Scharfenberger | 239/1 |
| 3,905,856 | 9/1975 | Magee | 239/1 |
| 4,824,017 | 4/1989 | Mansfield | 239/1 |
| 5,388,764 | 2/1995 | Moses | 239/427 |
| 5,388,767 | 2/1995 | Moses | 239/427 |
| 5,388,768 | 2/1995 | Moses | 239/427 |
| 5,405,083 | 4/1995 | Moses | 239/9 |

*Primary Examiner*—Andres Kashnikow
*Assistant Examiner*—Lisa Ann Douglas
*Attorney, Agent, or Firm*—J. K. Mueller, Jr.; Mary E. Picken; Mark Connaughton

[57] ABSTRACT

One aspect of the present invention is a spray gun adapted for spray-applying fiber-reinforced resins with ceramic fiber loadings of at least about 55 wt-%. Such novel spray gun has an inlet for admitting the fiber-reinforced resin; an air inlet for atomizing the fiber-reinforced resin; a catalyst inlet; and an outlet for expelling catalyzed fiber-reinforced resin from the spray gun. The spray gun also has a straight-line delivery channel in fluid communication with the resin inlet, the catalyst inlet, and the outlet. A flow actuator is provided for selectively actuating admission of the fiber-reinforced resin and the catalyst into the spray gun. The resin inlet and the catalyst inlet are disposed for admitting resin and catalyst, respectively, in line into the straight-line delivery channel. The air inlet is disposed for admitting air into the straight-line delivery channel at an acute angle with and in the direction of flow in the straight-line channel and is located after both the resin inlet and the catalyst inlet. Another aspect of the present invention is an apparatus for spray-applying fiber-reinforced resins with ceramic fiber loadings of at least about 55 wt-%. Such apparatus includes the novel spray gun, a tank for housing a fiber-reinforced resin; a pump for pumping fiber-reinforced resin from the resin tank to the spray gun resin inlet; a tank for housing catalyst for the resin; a pump for pumping catalyst from the catalyst tank to the spray gun catalyst inlet; and an atomizing air supply in communication with the spray gun air inlet.

18 Claims, 3 Drawing Sheets

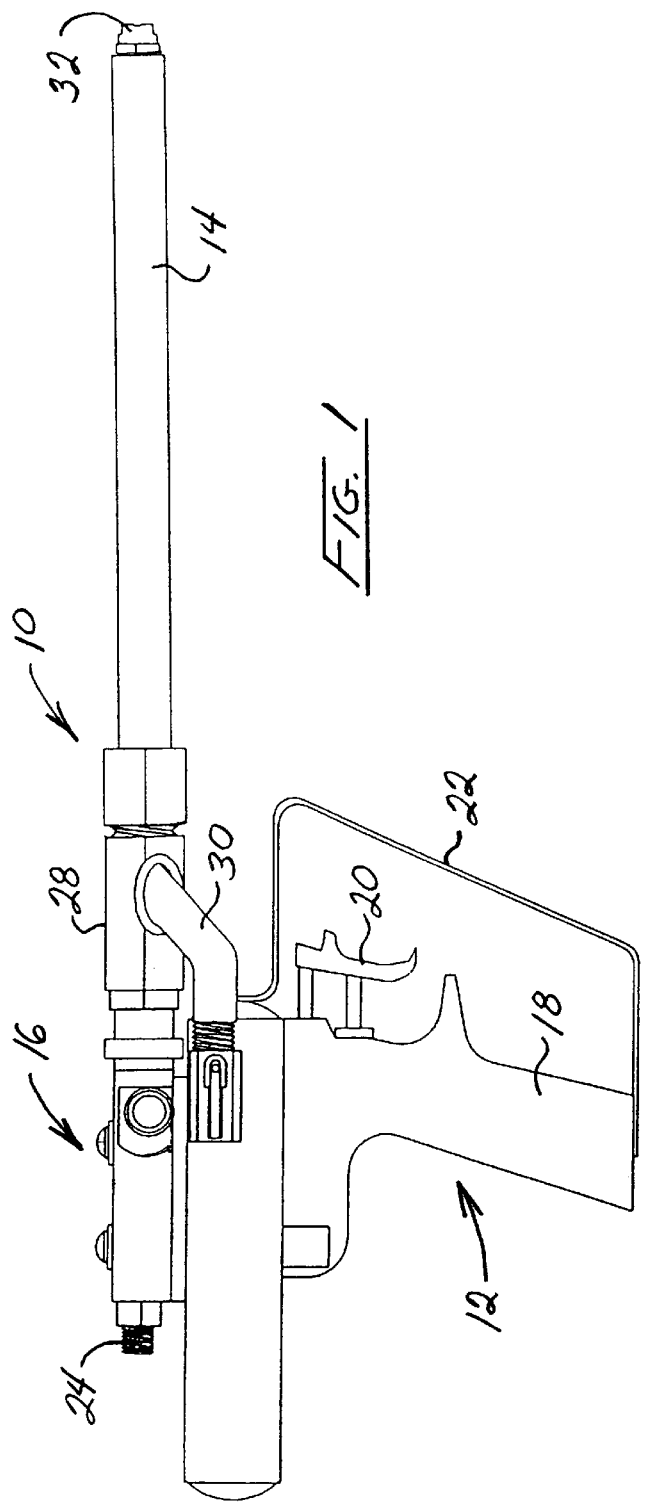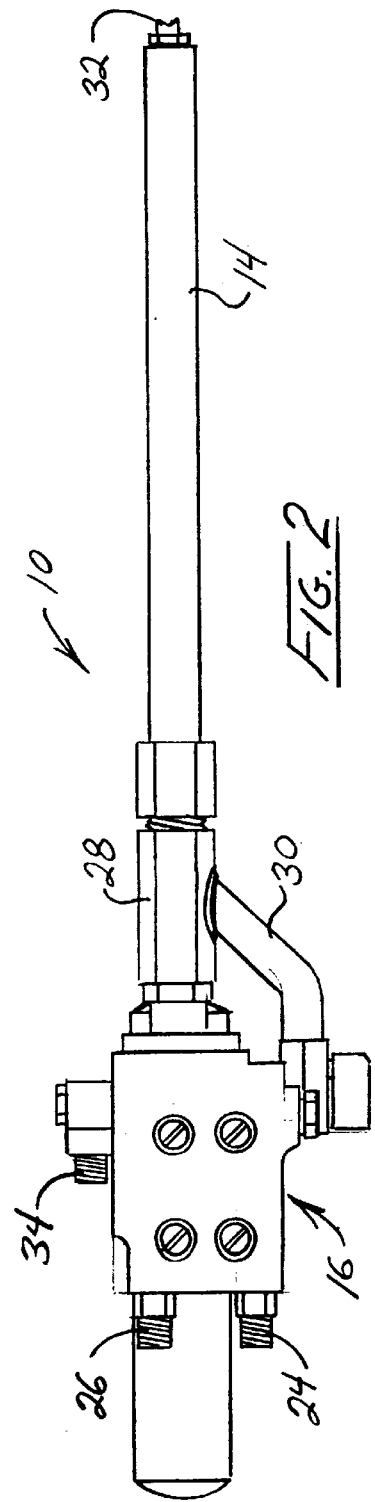

METHOD AND APPARATUS FOR SPRAY APPLYING FIBER-REINFORCED RESINS WITH HIGH CERAMIC FIBER LOADING

CROSS-REFERENCE TO RELATED APPLICATIONS

None

STATEMENT REGARDING FEDERALLY SPONSORED RESEARCH

Not applicable.

BACKGROUND OF THE INVENTION

The present invention relates generally to fiber-reinforced molding of parts and more particularly to spray equipment for spray-applying fiber-reinforced heat-curable resins containing high ceramic fiber loadings.

In the manufacture of a wide variety of fibrous-reinforced parts (e.g., FRP or fiber glass reinforced parts), it would be desirable to spray apply a unsaturated resin (catalyzed, heat-curable, unsaturated polyester resin) which would contain a high loading (e.g., say, 55% to 75% by weight) of reinforcing fiber (e.g., ceramic fiber like wollastinite fibers of 0.0017 to 0.0059 mm in average particle diameter with aspect ratios of from about 5 to 17). Unfortunately, conventional spray equipment will not properly spray such resins with such high fiber loadings. The spray equipment, especially the spray guns, become plugged easily by the ceramic fibers which makes down time of the equipment particularly troublesome at commercial operations. It is troublesome enough to spray conventional catalyzed unsaturated resins because of premature gelation problems, cleaning of the equipment during down time cycles, and the like. To add a high loading of ceramic fiber means that the equipment would have to spray a resin mix having the consistency of oatmeal, and a mix that is quite abrasive due to the ceramic fiber content.

One approach to solving the problem of air void surface defects in FRP parts, as proposed in U.S. Pat. No. 4,568,604 (expressly incorporated herein by reference), involves the spraying of ceramic fiber-loaded resins over a layer of gel coat which covers the mold. Such a process is limited in its ability to spray high loadings of ceramic fiber (a mixture of calcium silicate and mica). Still, the need for being able to spray resins with high ceramic fiber loadings is underscored by this patent.

The present invention addresses the foregoing problems associated with spray-applying high fiber loaded, thermally-curable, catalyzed resins used in molding of fiber reinforced parts by use of uniquely designed spray equipment.

BRIEF SUMMARY OF THE INVENTION

One aspect of the present invention is a spray gun adapted for spray-applying fiber-reinforced resins with ceramic fiber loadings of at least about 55 wt-%. Such novel spray gun has an inlet for admitting the fiber-reinforced resin; an air inlet for atomizing the fiber-reinforced resin; a catalyst inlet; and an outlet for expelling catalyzed fiber-reinforced resin from the spray gun. The spray gun also has a straight-line delivery channel in fluid communication with the resin inlet, the catalyst inlet, and the outlet. A flow actuator is provided for selectively actuating admission of the fiber-reinforced resin and the catalyst into the spray gun. The resin inlet and the catalyst inlet are disposed for admitting resin and catalyst, respectively, in line into the straight-line delivery channel. The air inlet is disposed for admitting air into the straight-line delivery channel at an acute angle with and in the direction of flow in the straight-line channel and is located after both the resin inlet and the catalyst inlet.

Another aspect of the present invention is an apparatus for spray-applying fiber-reinforced resins with ceramic fiber loadings of at least about 55 wt-%. Such apparatus includes the novel spray gun, a tank for housing a fiber-reinforced resin; a pump for pumping fiber-reinforced resin from the resin tank to the spray gun resin inlet; a tank for housing catalyst for the resin; a pump for pumping catalyst from the catalyst tank to the spray gun catalyst inlet; and an atomizing air supply in communication with the spray gun air inlet.

Advantages of the present invention include the ability to spray apply curable resins that contain from between about 55 wt-% and 75 wt-% ceramic fiber. Another aspect of the present invention is spray equipment that can be cleaned readily during down time cycles. A further advantage of the present invention is spray equipment that does not become easily plugged by the high ceramic fiber content in the resin being sprayed. A yet further advantage of the present invention is spray equipment that can deliver a bead of high ceramic fiber content resin by merely discontinuing the flow of atomizing air. These and other advantages will become readily apparent to those skilled in the art based on the disclosure herein.

BRIEF DESCRIPTION OF THE DRAWINGS

FIG. 1 is a side view of the novel spray gun that can spray fiber-reinforced resins with ceramic fiber loadings;

FIG. 2 is an overhead view of the spray gun of FIG. 1;

The drawings will be described in detail below.

DETAILED DESCRIPTION OF THE INVENTION

A wide variety of molding processes can use the inventive spray gun and system to advantage. These molding processes include, inter alia, open molding, resin transfer molding (RTM), press molding, thermoplastic injection molding, blow molding, shrink fixtures, scrimp molding, and the like. These molding processes are used to manufacture a wide variety of parts including, inter alia., transportation components (e.g., van running boards, van tops, automobile bodies, truck caps, deck lids), architectural components (e.g., shower stalls, tanks, cowlings), boat hulls, pultrusion parts, heat shields, abrasion resistant surfaces, BMC (bulk molding compounds) parts, SMC (sheet molding compounds) parts, and the like. Ordinarily, resin impregnated fiber is placed in a mold which is heated, often under pressure, to form the ultimate part. On occasion, it would be useful to be able to spray unsaturated resin onto/into a fiber lay-up; however, heretofore such spray operation was limited to the spraying of resins containing a low loading of ceramic fiber. With the present invention, however, spraying curable (catalyzed) resins containing a high loading of ceramic fiber now is possible.

Figure 3:
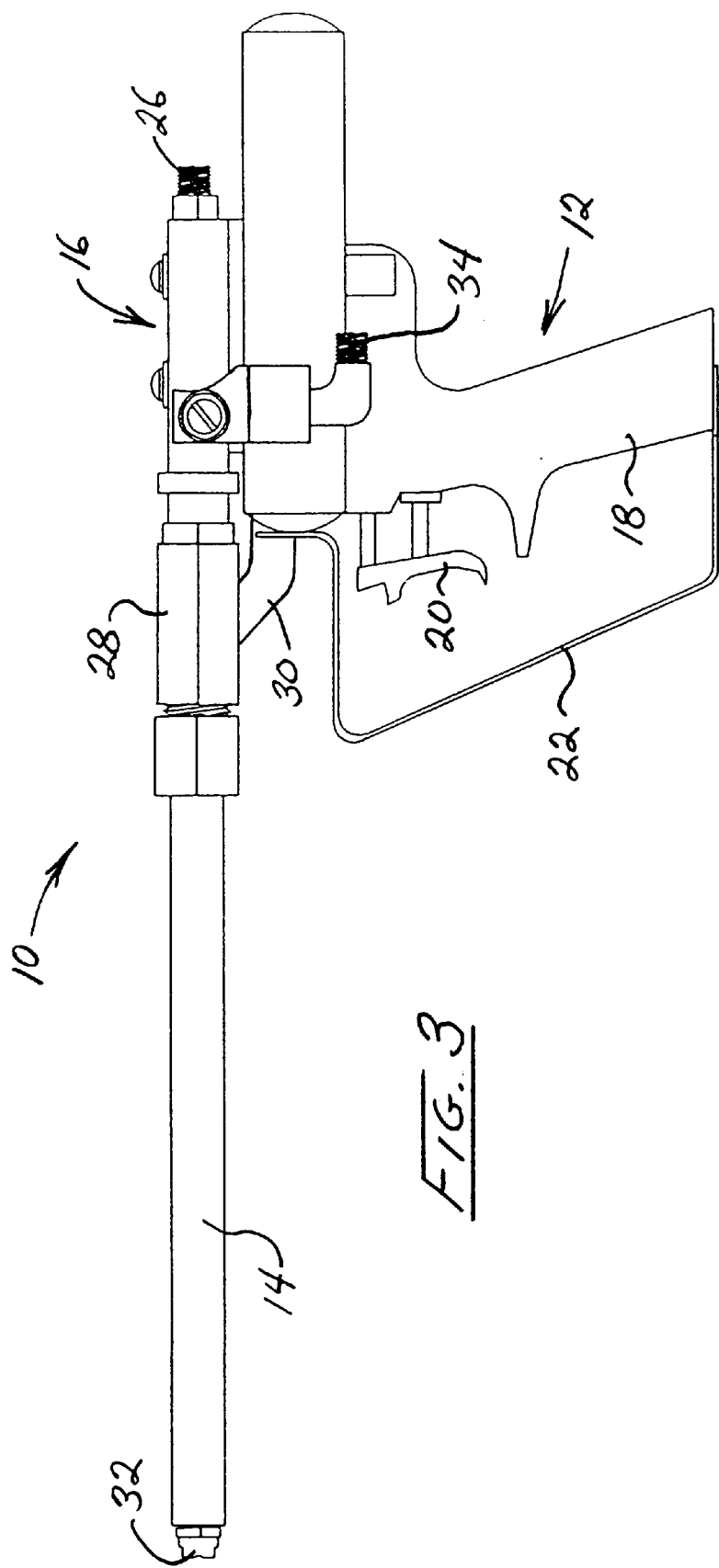
FIG. 3 is a side view of the opposite side of the spray gun shown in FIG. 1.

Referring to FIG. 1, gun 10 is seen to be composed generally of handle assembly 12, mixing tip 14, and valve body 16. Handle assembly 12 is composed of handle 18, trigger 20, and trigger guard 22. Valve body 16 has resin inlet 24 and catalyst inlet 26 (see FIGS. 2 and 3) through which fiber-reinforced resin and catalyst, respectively are admitted into gun 10. A unique design feature of gun 10 is the flow path for resin and catalyst. Work on the present invention revealed that the resin flow path for resins with high ceramic fiber loadings could not have any sharp bends; otherwise, the reinforcing fiber would agglomerate causing plugging problems. Thus, the flow path of resin through gun 10 commences with inlet 24 which admits resin inline with a straight flow path which has been constructed into gun 10. This flow path commences in valve body 16 and continues into mixing chamber 28, and thence into mixing tip 14. Catalyst inlet 26 similarly is parallel to the resin inlet 24 in establishing a similar co-current in-line flow path.

Atomizing air line 30 feeds atomizing air (atomizing gas generally, although air is predominantly used in industry) into gun 10 for mixing with the catalyst/resin mix already established in valve body 16. Work on the present invention also revealed that if atomizing air were admitted at a 90° angle into the resin/catalyst flow path that agglomeration of the ceramic fiber with consequent plugging also would occur for resins highly loaded with ceramic fiber. Thus, the angle of entry of atomizing air into gun 10 via line 30 is at an acute angle with, and in the same direction as, the flow of resin/catalyst in gun 10.

Finally, the resin flow path in gun 10 encounters mixing tip 14 which is a typical in-line spiral mixer (e.g., TAH static mixer). Finally the catalyzed resin is sprayed from gun 10 via nozzle which terminates mixing tip 14. It will observed, however, that a straight flow path has been established in gun 10 from entry of resin into gun 10 via inlet 24 to its expulsion from gun 10 via nozzle 32. While mild bends in the flow path probably could be tolerated, sharp bends are to be avoided in order to avoid plugging of the gun by the high ceramic fiber loadings contained in the resin fed to gun 10. Finally, air line 34 is activated by trigger 20. Air in line 34 activates valve body 16 for admitting resin and catalyst to flow into valve body 16 and through gun 10 for spraying. One commercially-available spray gun that has been modified in accordance with the precepts of the present invention is a Venus Pro Gun (Venus-Gusemer).

Figure 4:
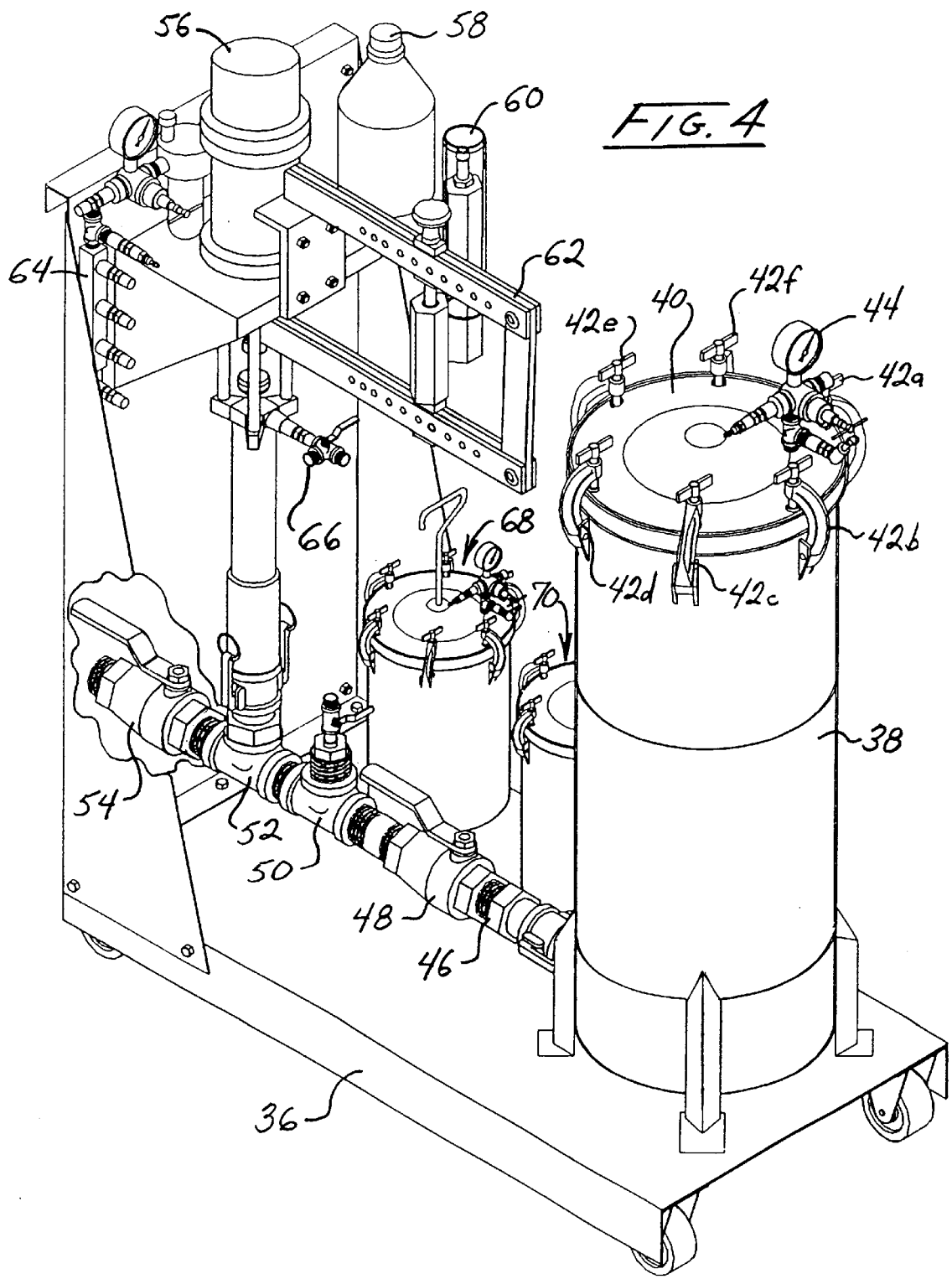
FIG. 4 is a perspective view of the apparatus system used in conjunction with the spray gun of FIG. 1.

Gun 10 is supplied resin, catalyst, and air from an apparatus such as is illustrated in FIG. 4. All of the equipment necessary for spraying resins containing a high content of ceramic fiber conveniently can be mounted on wheeled cart 36. This makes the apparatus portable in a plant so that molds in different locations and in different parts lines can be serviced by the same spray equipment. This flexibility makes the inventive equipment even more useful in commercial operations.

Resin tank 38 preferably is made from stainless steel and is fitted with lid 40 which is attached to resin tank 38 by lid clamps 42a–f, and resin tank gauge assembly 44. Resin tank 38 is pressured by air (from a source not shown) via manifold 64 (described later) to, say, about 20 psi. Resin mix housed in resin tank 38 is withdrawn via 2 in line 46 through ball valve 48, tee valve 50, pump tee 52, and out valve 66 for feeding to gun 10 (via a line not shown). Resin is pumped to gun 10 via pump assembly 56 which can be set at, say about 25 psi, for delivering the resin mix to the gun at, say, about 575 psi. Ball valve 54 completes the piping for resin from tank 38.

Cart 36 also is fitted with catalyst bottle 58 which is fed via catalyst pump 60 to gun 10 via a line not shown. Slave assembly 62 allows for quick adjustment of the catalyst level fed to gun 10 for the resin mix. Air manifold 64 (air lines therefrom not shown) distributes air to resin tank 38, as well as to solvent flush tanks 68 and 70 (described below), and to pump assembly 56 which is an air-activated pump.

The solvent flush system incorporated into the inventive spray apparatus system involves solvent from solvent flush tank 68 (similar in construction to resin tank 38) being fed to the valve on tee valve 50. When spraying of the resin mix is terminated, in order to prevent the resin from hardening in gun 10, solvent from tank 68 can be fed to gun 10 via resin inlet 24 by shutting valve 66 and opening valve 50. Atomizing air to gun 10 via air inlet 30 can be maintained along with the flow of solvent to effectively clean gun 10. In this regard, resin flush tank 70 (similar in construction to resin tank 38) is piped to pump solvent through tank 38 to flush it during down-time cycles of use of the inventive spray system.

Cart 36 also can be fitted with a tank for a blowing agent (conventional nitrogen blowing agent, for example, such as Chrom-Tek Alcel blowing agent, Chrom-Tek, Collierville, Tenn.), slave assembly (like slave assembly 62), pump, and appropriate lines for incorporation of a blowing agent into the resinous composition sprayed by gun 10.

Suitable resins for use with the inventive spray system are conventional for the molding art and include, for example, unsaturated polyester resins admixed with styrene and suitably formulated depending upon the part being produced, the type of reinforcement, and like factors well known to those skilled in this art. The use of peroxide and like catalysts also is well known in this art as appropriate solvents. The reinforcing agents also are known and include, for example, calcium silicate (e.g.,. wollastinite) admixed with mica.

As noted above, the inventive spray system can be used to spray fibrous-reinforced curable resin systems in conventional spray patterns, such as described in U.S. Pat. No. 4,568,604, cited above. Alternatively, the resin system can blown by use of a blowing agent to achieve a volumetric expansion and to speed cure of the resin due to the presence of nitrogen gas. Finally, with the atomizing air spray inactivated, a bead of the resin matrix can be expelled from the gun for use, for example, to fill sharp corners, or for bonding and bedding parts in assembly.

While the inventive spray system initially was designed for the rigors of spraying resins with high ceramic fiber loadings, it will be appreciated that it could be used to spray syntactic foams, bondo-type products, and like products. Thus, the ability of the inventive spray system to handle a wide variety of products adds to its flexibility and value in commercial settings. It will appreciated that the inventive spray gun and apparatus can be modified in accordance with the precepts of the present invention and still be within the scope of the present invention.

We claim:

1. A spray gun adapted for spray-applying fiber-reinforced resins with ceramic fiber loadings of at least about 55 wt-%, which comprises: an inlet for admitting said fiber-reinforced resin; an air inlet for atomizing said fiber-reinforced resin; a catalyst inlet; an outlet for expelling catalyzed fiber-reinforced resin from said spray gun; a straight-line channel in fluid communication with said resin inlet, said catalyst inlet, and said outlet; a flow actuator for selectively actuating admission of said fiber-reinforced resin and said catalyst into said spray gun; said resin inlet and said catalyst inlet admitting said resin and said catalyst, respectively, in line into said straight-line channel; said air inlet admitting air into said straight-line channel at an acute angle in the direction of flow in said straight-line channel and located after both said resin inlet and said catalyst inlet.

2. The spray gun of claim 1, which has its outlet fitted with an in-line spiral mixing tip assembly.

3. The spray gun of claim 1, which is fitted with a spray nozzle.

4. The spray gun of claim 2, which has its mixing tip assembly fitted with a spray nozzle.

5. Apparatus for spray-applying fiber-reinforced resins with ceramic fiber loadings of at least about 55 wt-%, which comprises:
  (a) a spray gun having an inlet for admitting said fiber-reinforced resin; an air inlet for atomizing said fiber-reinforced resin; a catalyst inlet; an outlet for expelling catalyzed fiber-reinforced resin from said spray gun; a straight-line channel in fluid communication with said resin inlet, said catalyst inlet, and said outlet; a flow actuator for selectively actuating admission of said fiber-reinforced resin and said catalyst into said spray gun; said resin inlet and said catalyst inlet admitting said resin and said catalyst, respectively, in line into said straight-line channel; said air inlet admitting air into said straight-line channel at an acute angle in the direction of flow in said straight-line channel and located after both said resin inlet and said catalyst inlet;
  (b) a tank for housing a fiber-reinforced resin;
  (c) a pump for pumping fiber-reinforced resin from said resin tank to said spray gun resin inlet;
  (d) a tank for housing catalyst for said resin;
  (e) a pump for pumping said catalyst from said catalyst tank to said spray gun catalyst inlet; and
  (f) an atomizing air supply in communication with said spray gun air inlet.

6. The apparatus of claim 5, which additionally comprises:
  (g) a tank for housing a blowing agent; and
  (h) a pump for pumping said blowing agent to said spray gun.

7. The apparatus of claim 5, which is fitted with an in-line spiral mixing tip assembly.

8. The apparatus of claim 5, which is fitted with a spray nozzle.

9. The apparatus of claim 7, which is fitted with a spray nozzle.

10. A method of spraying fiber-reinforced resins with ceramic fiber loadings of at least about 55 wt-%, which comprises actuating a spray gun which is connected to a source of resin having a fiber loading of at least about 55 wt-% and to a source of catalyst for said resin, said spray gun comprising:

an inlet for admitting said fiber-reinforced resin; an air inlet for atomizing said fiber-reinforced resin; a catalyst inlet; an outlet for expelling catalyzed fiber-reinforced resin from said spray gun; a straight-line channel in fluid communication with said resin inlet, said catalyst inlet, and said outlet; a flow actuator for selectively actuating admission of said fiber-reinforced resin and said catalyst into said spray gun; said resin inlet and said catalyst inlet admitting said resin and said catalyst, respectively, in line into said straight-line channel; said air inlet admitting air into said straight-line channel at an acute angle in the direction of flow in said straight-line channel and located after both said resin inlet and said catalyst inlet.

11. The method of claim 10, wherein the fiber-reinforced resin with ceramic fiber loading contains between about 55 wt-% and 75 wt-%.

12. The method of claim 10, wherein the ceramic fiber in the fiber-reinforced resin sprayed comprises calcium silicate.

13. The method of claim 12, wherein said calcium silicate is wollastinite.

14. The method of claim 10, wherein said no atomizing air is admitted into said gun via said air inlet so that a bead of fiber-reinforced resin is expelled from said gun.

15. The method of claim 10, wherein said resin comprises an unsaturated polyester resin admixed with styrene.

16. The method of claim 10, wherein said spray gun comprises:
  (a) said spray gun;
  (b) a tank for housing a fiber-reinforced resin;
  (c) a pump for pumping fiber-reinforced resin from said resin tank to said spray gun resin inlet;
  (d) a tank for housing catalyst for said resin;
  (e) a pump for pumping said catalyst from said catalyst tank to said spray gun catalyst inlet; and
  (f) an atomizing air supply in communication with said spray gun air inlet.

17. The method of claim 10, wherein a blowing agent is also fed to said gun along with said catalyst.

18. The method of claim 10, wherein a solvent for said resin is fed to said gun through a solvent inlet while no resin or catalyst is fed to said gun in order to clean said gun.

* * * * *